(12) United States Patent
Kirkham et al.

(10) Patent No.: US 10,022,822 B2
(45) Date of Patent: Jul. 17, 2018

(54) MULTI-LAYERED ALUMINIUM BRAZING SHEET MATERIAL

(71) Applicant: ALERIS ROLLED PRODUCTS GERMANY GMBH, Koblenz (DE)

(72) Inventors: Steven Kirkham, Ransbach-Baumbach (DE); Bernd Jacoby, Limburg (DE)

(73) Assignee: ALERIS ROLLED PRODUCTS GERMANY GMBH, Koblenz (DE)

(*) Notice: Subject to any disclaimer, the term of this patent is extended or adjusted under 35 U.S.C. 154(b) by 0 days.

(21) Appl. No.: 15/500,134

(22) PCT Filed: Jul. 9, 2015

(86) PCT No.: PCT/EP2015/065696
§ 371 (c)(1),
(2) Date: Jan. 30, 2017

(87) PCT Pub. No.: WO2016/015974
PCT Pub. Date: Feb. 4, 2016

(65) Prior Publication Data
US 2017/0304954 A1 Oct. 26, 2017

(30) Foreign Application Priority Data

Jul. 31, 2014 (EP) ..................... 14179341

(51) Int. Cl.
| B32B 15/01 | (2006.01) |
| B23K 35/02 | (2006.01) |
| B32B 15/20 | (2006.01) |
| B23K 35/28 | (2006.01) |
| C22C 21/02 | (2006.01) |
| B23K 101/14 | (2006.01) |

(52) U.S. Cl.
CPC ........ *B23K 35/0238* (2013.01); *B23K 35/286* (2013.01); *B32B 15/016* (2013.01); *B32B 15/20* (2013.01); *C22C 21/02* (2013.01); *B23K 2201/14* (2013.01)

(58) Field of Classification Search
None
See application file for complete search history.

(56) References Cited

U.S. PATENT DOCUMENTS

| 6,555,251 B2 | 4/2003 | Kilmer | |
| 8,932,728 B2* | 1/2015 | Matsumoto | B23K 35/0238 |
| | | | 148/535 |
| 2003/0099856 A1 | 5/2003 | Takeno et al. | |
| 2007/0122648 A1 | 5/2007 | Vieregge et al. | |
| 2007/0158386 A1 | 7/2007 | Dulac et al. | |
| 2008/0274367 A1 | 11/2008 | Kilmer et al. | |
| 2011/0198392 A1 | 8/2011 | Wittebrood | |
| 2012/0237793 A1* | 9/2012 | Baumann | B23K 35/0238 |
| | | | 428/654 |
| 2013/0034744 A1 | 2/2013 | Anderson et al. | |
| 2013/0306714 A1 | 11/2013 | Wittebrood | |
| 2017/0246710 A1 | 8/2017 | Kirkham et al. | |

FOREIGN PATENT DOCUMENTS

| EP | 1430988 A1 | 6/2004 |
| EP | 1497116 | 1/2005 |
| EP | 1497116 * | 8/2009 |
| JP | H03124394 A | 5/1991 |
| WO | 03089237 A1 | 10/2003 |
| WO | 2004112992 A2 | 12/2004 |
| WO | 2007042206 A1 | 4/2007 |
| WO | 2010052231 A1 | 5/2010 |
| WO | 2012104147 A1 | 8/2012 |
| WO | 2012125929 A1 | 9/2012 |
| WO | 2016015917 A1 | 2/2016 |

OTHER PUBLICATIONS

International Search Report and Written Opinion dated Aug. 25, 2015 for PCT/EP2015/065696 to Aleris Rolled Roducts Germany GMBH filed July 9, 2015.

* cited by examiner

*Primary Examiner* — Daniel J. Schleis
(74) *Attorney, Agent, or Firm* — Vorys, Sater, Seymour and Pease LLP

(57) ABSTRACT

Multilayered brazing sheet including aluminium core alloy layer of 3xxx-series aluminium alloy having, in wt. %, up to 0.4% Si, up to 0.5% Fe, 0.4% to 0.75% Cu, 0.6% to 1.1% Mn, up to 0.07% Mg, up to 0.2% Cr, up to 0.25% Zr, up to 0.2% Ti, up to 0.15% Zn, balance aluminium and impurities, first and second brazing clad layers on opposed faces of core layer, and an inter-layer on either or both sides of core layer between the core layer and first or second brazing clad layer. The first and second brazing layers are 4xxx-series aluminium alloy. The inter-layer(s) is 3xxx-series aluminium alloy, having, in wt. %, up to 0.6% Si, 0.2% to 0.7% Fe, up to 0.2% Cu, 1.0% to 1.6% Mn, up to 0.25% Zn, up to 0.04% Mg, up to 0.2% Cr, up to 0.2% Zr, up to 0.07% Ti, balance aluminium and impurities.

19 Claims, No Drawings

MULTI-LAYERED ALUMINIUM BRAZING SHEET MATERIAL

CROSS-REFERENCE TO RELATED APPLICATIONS

This is a § 371 National Stage Application of International Application No. PCT/EP2015/065696 filed on Jul. 9, 2015, claiming the priority of European Patent Application No. 14179341.4 filed on Jul. 31, 2014.

FIELD OF THE INVENTION

The invention relates to a multi-layered brazing sheet material consisting of an aluminium core alloy layer provided with a first brazing clad layer material on one face of said aluminium core layer and a second brazing clad layer material on the other face of said aluminium core material, and an interlayer or inter-liner positioned between the aluminium core alloy layer and the first and/or second brazing clad layer material. The invention further relates to a brazed heat exchanger comprising various components and at least one component being made from the aluminium alloy brazing sheet according to this invention.

BACKGROUND TO THE INVENTION

As will be appreciated herein below, except as otherwise indicated, aluminium alloy designations and temper designations refer to the Aluminum Association designations in Aluminum Standards and Data and the Registration Records, as published by the Aluminum Association in 2014.

For any description of alloy compositions or preferred alloy compositions, all references to percentages are by weight percent unless otherwise indicated.

Substrates of aluminium or aluminium alloy in the form of sheet or extrusion, are used to make shaped or formed products. In some of these processes parts of (shaped) aluminium comprising substrates are interconnected. One end of a substrate may be interconnected with the other end or one substrate may be assembled with one or more other substrates. This is commonly done by brazing, a technique well known to the person skilled in the art. In a brazing process, a brazing filler metal or brazing alloy, or a composition producing a brazing alloy upon heating, is applied to at least one portion of the substrate to be brazed. After the substrate parts are assembled, they are heated until the brazing metal or brazing alloy melts. The melting point of the brazing material is lower than the melting point of the aluminium substrate or aluminium core sheet.

Brazing sheet products find wide applications in heat exchangers and other similar equipment. Conventional brazing products have a core of rolled sheet, typically, but not exclusively an aluminium alloy of the 3xxx-series, having on at least one surface of the core sheet an aluminium clad layer (also known as an aluminium cladding layer). The aluminium clad layer is made of a 4xxx-series alloy comprising silicon in an amount in the range of 2% to 20% by weight, and preferably in the range of about 7% to 14% by weight. The aluminium clad layer may be coupled or bonded to the core alloy in various ways known in the art, for example by means of roll bonding, cladding spray-forming or semi-continuous or continuous casting processes. These aluminium clad layers have a liquidus temperature typically in the range of about 540° C. to 615° C.

There is a need for further improved brazing sheet materials that can be supplied in a fully annealed temper, and is sufficiently formable to produce complex shaped aluminium substrates, and that can be exposed to both vacuum brazing and controlled-atmosphere brazing ("CAB") events, and achieves high levels of post-braze corrosion resistance.

DESCRIPTION OF THE INVENTION

It is an object of the invention to provide a brazing sheet material that meet this need, or at least an alternative product capable of being supplied in a fully annealed temper, and is sufficiently formable to produce complex shaped aluminium substrates, and that can be exposed to both vacuum brazing and controlled-atmosphere brazing events, and achieves high levels of post-braze corrosion resistance.

This and other objects and further advantages are met or exceeded by the present invention providing a 4-layered or 5-layered brazing sheet material consisting of an aluminium core alloy layer provided with a first brazing clad layer material on one face of said aluminium core layer and a second brazing clad layer material on the other face of said aluminium core material, and an inter-layer on one or either sides of the core layer positioned between the aluminium core alloy layer and the respective first brazing clad layer material and second brazing clad layer material, wherein the core layer is made from an 3xxx-series aluminium alloy having, in wt. %, up to 0.4% Si, up to 0.5% Fe, 0.4% to 0.75% Cu, 0.6% to 1.1% Mn, up to 0.07% Mg, preferably up to 0.04% Mg, up to 0.2% Cr, up to 0.25% Zr, up to 0.2% Ti, up to 0.15% Zn, balance aluminium and impurities, wherein the first brazing layer and the second brazing layer are made from an 4xxx-series aluminium alloy having 6% to 14% Si and up to 2% Mg, balance aluminium and impurities, and wherein each of the inter-layer(s) is made from an aluminium alloy of the 3xxx-series alloys, having, in wt. %, up to 0.6% Si, 0.2% to 0.7% Fe, up to 0.2% Cu, 1.0% to 1.6% Mn, up to 0.25% Zn, up to 0.04% Mg, up to 0.2% Cr, up to 0.2% Zr, up to 0.07% Ti, balance aluminium and impurities.

The particular 3xxx-series inter-layer controls the diffusion, in particular the Cu from the core and the Si from the brazing clad material, from the interfacial zone while maintaining a high thermal fatigue performance. The brazing sheet material according to this invention has a very good corrosion resistance in acidic environments, can be subjected to cyclic temperature and pressure variations, as typically found in automotive applications (e.g. as the result of spent fuel vapour condensation), and as such, the brazing sheet material is suitable for being applied in direct air-to-air charge air cooling ("CAC") or intercooling, air-to-water CAC, water-to-air CAC, air-to-refrigerant CAC, refrigerant-to-air CAC, water-to-refrigerant condenser and evaporator whereby the 3xxx interliner is facing the waterside, exhaust gas cooling, exhaust gas recirculation systems, hybrid cooling system, two-phase cooling systems, tubing for radiator and heater core, plate material for battery cooling systems, etc., and forms at least an alternative product capable of extending the serviceable life of such heat exchanger units beyond the scope of performance feasible with the current art. The brazing sheet material is producible as coil and sheet, to support mass production scale or batch scale processing, and is sufficiently formable to produce the complex shaped aluminium substrates referenced above. The brazing sheet material is brazeable in both controlled atmosphere brazing process, either with or without the application of a brazing flux material, and vacuum brazing processes, and has high thermal stability in cyclic operation.

In an embodiment the 3xxx-series aluminium core alloy is made from an aluminium alloy consisting of, in wt. %:
up to 0.3% Si, and more preferably up to 0.2%,
up to 0.5% Fe, preferably in a range of 0.15% to 0.45%, and more preferably 0.25% to 0.45%,
0.4% to 0.75% Cu, preferably 0.50% to 0.70%, and more preferably 0.50% to 0.68%,
0.6% to 1.1% Mn, preferably 0.7% to 1.0%, and more preferably 0.7% to 0.95%,
up to 0.04% Mg, preferably up to 0.02%, such that the aluminium alloy is substantially free from Mg,
up to 0.2% Cr, preferably up to 0.09%, more preferably up to 0.04%,
up to 0.25% Zr, preferably up to 0.09%, more preferably up to 0.04%,
up to 0.2% Ti, preferably 0.05% to 0.2%, more preferably 0.06% to 0.12%,
up to 0.15% Zn, preferably up to 0.1%,
balance aluminium and impurities.

The first and the second brazing clad liner are each made from a 4xxx-series aluminium alloy having 6% to 14% Si and up to 0.35% Mg, ideally for use in a CAB process. Preferably, the Si is up to 11%. The Mg level is preferably up to 0.10%, and more preferably up to 0.04%, such that the aluminium alloy is substantially free from Mg. The balance is made by aluminium and unavoidable impurities, which in practical terms would mean up to 0.6% Fe, up to 0.1% Mn, up to 0.08% Cu, up to 0.20% Zn, others each <0.05%, total <0.2%, remainder aluminium.

In an alternative embodiment the first brazing clad liner and the second brazing clad liner are each made from a 4xxx-series aluminium alloy having 6% to 14% Si and up to 2% Mg, balance aluminium and impurities. Preferably, the Si content is in a range of 7% to 11% Si. Preferably, the Mg content is in a range of 0.4% to 2%, and more preferably 1% to 1.8% Mg, to enable the brazing sheet material to be used in a vacuum brazing process. The balance is made by aluminium and unavoidable impurities, which in practical terms would mean up to 0.6% Fe, up to 0.1% Mn, up to 0.1% Cu, up to 0.2% Zn, others each <0.05%, total <0.2%, remainder aluminium.

In an alternative embodiment, the first and the second brazing clad liner are each made from a 4xxx-series aluminium alloy having 6% to 10.5% Si, up to 0.5% Mg, up to 0.5% Bi and/or up to 0.5% Y, ideally for use in a fluxless controlled atmosphere brazing process. Preferably, the Si is up to 9%. The balance is made by aluminium and unavoidable impurities, which in practical terms would mean up to 0.6% Fe, up to 0.1% Mn, up to 0.08% Cu, up to 0.20% Zn, others each <0.05%, total <0.2%, remainder aluminium.

The interlayer or inter-liner is made from an aluminium alloy of the 3xxx-series alloys. In a preferred embodiment, the interlayer has a thickness of 90 μm or less, and preferably of 60 μm or less, for example of about 40 μm or about 50 μm, and is to limit diffusion of alloying elements from the core layer to the brazing layer, and as such limit inter-granular corrosion propagation through the core layer in the post-braze condition, and thereby significantly improve the post-braze corrosion performance of the brazing sheet product when applied in a heat exchanger. The specific interlayer in accordance with this invention provides also a high thermal stability in cyclic operation. The 3xxx-series interlayer also provides galvanic protection to the 3xxx-series core alloy.

The interlayer(s) are each made from an aluminium alloy of the 3xxx-series alloys, having, in wt. %,
up to 0.6% Si, preferably 0.15% to 0.55%, more preferably 0.2% to 0.5%,
0.2% to 0.7% Fe, preferably 0.25% to 0.65%, more preferably 0.3% to 0.65%,
up to 0.2% Cu, preferably up to 0.15%, more preferably up to 0.10%,
1.0% to 1.6% Mn, preferably 1.0% to 1.5%, more preferably 1.1% to 1.4%,
up to 0.25% Zn,
up to 0.04% Mg, preferably up to 0.02%, such that the aluminium alloy is substantially free from Mg,
up to 0.2% Cr,
up to 0.2% Zr,
up to 0.07% Ti, preferably up to 0.06%, more preferably 0.02% to 0.06%,
balance aluminium and impurities.

Zr can be tolerated to substantial levels as an impurity element or can be added purposively to influence the recrystallisation behaviour in the inter-liner and thereby improving the resistance against intergranular corrosion. In an embodiment Zr is not added to the aluminium alloy, but can be present as an unavoidable impurity element at a level of <0.05%, and preferably <0.03%, such that the aluminium alloy is substantially free from Zr.

Cr can be tolerated to substantial levels as an impurity element or can be added purposively alone or in combination with Zr to influence the recrystallisation behaviour in the inter-liner and thereby improving the resistance against intergranular corrosion. In an embodiment Cr is not added to the aluminium alloy, but can be present as an unavoidable impurity element at a level of <0.05%, and preferably <0.03%, such that the aluminium alloy is substantially free from Cr.

In the inter-liner, the Zn is present as a tolerable impurity at a level of up to 0.25%, preferably up to 0.15%, and more preferably up to 0.1%.

In an embodiment of the invention, the multi-layered brazing sheet material consists of a 4-layered structure consisting of the following sequence of layers: first brazing clad layer, 3xxx inter-liner, core layer, and second brazing clad layer. In this particular embodiment the 3xxx interliner should face the waterside when used in a cooling system, for example in a water-to-refrigerant condenser or evaporator.

In an embodiment of the invention, the multi-layered brazing sheet material consists of a 5-layered structure consisting of the following sequence of layers: first brazing clad layer, 3xxx inter-liner, core layer, 3xxx inter-liner, and second brazing clad layer.

The brazing sheet material according to this invention can be manufactured via various techniques. For example by roll bonding as is well known in the art. Alternatively one or more of the layers can be applied on the core alloy layer by means of thermal spraying techniques. Or alternatively the core alloy layer and inter-liner(s) can be manufactured by means of casting techniques, for example as disclosed in international patent document WO-2004/112992-A2 (Alcan) as published on 29 Dec. 2004, whereby further layers can be applied by means of for example roll bonding or thermal spraying techniques.

The brazing sheet material according to the invention has a typical thickness at final gauge in the range of about 0.1 mm to 2.0 mm. The brazing sheet material is preferably up to about 1 mm thick at final gauge, and more preferably up to about 0.6 mm.

Each of the first and second brazing clad layers has typically a thickness of about 5% to 15% of the total thickness of the multi-layered sheet material, for example each of about 10%.

In an embodiment of the invention, the core layer has been homogenised during its manufacturing route prior to hot deformation into thinner gauge material. Typically, such a homogenisation heat treatment is performed in a temperature range of 400° C. to 650° C. for a soaking time in a range of about 5 to 48 hours, to enable O-temper material.

In an embodiment of the invention, the brazing sheet material is provided in an O-temper, and which is fully annealed.

In an embodiment of the invention, the brazing sheet material is provided in an H2x-temper, wherein x is 1, 2, 3, 4, 5, or 6. More preferably, it is provided in an H24-temper.

In another aspect of the invention is relates to a brazed tube made from the multi-layered brazing sheet material according to this invention acting as a fluid passage channel in a heat exchanger apparatus.

In another aspect of the invention is relates to a brazed heat exchanger comprising at least one tube made from the multi-layered brazing sheet material according to this invention. Ideally the heat exchanger is a charge-air-cooler ("CAC"). More preferably in a water-to-air CAC, in the art also known as a liquid-CAC.

The brazing sheet material is also suitable for being applied amongst others in an air-to-refrigerant CAC, air-to-air CAC, air-to-water CAC, air-to-refrigerant CAC, water-to-refrigerant condenser and evaporator whereby the 3xxx interliner is facing the waterside, exhaust gas cooler, exhaust gas recirculation system, hybrid cooling system, two-phase cooling system, tubing for radiator and heater core, plate material for a battery cooling system.

Thus, the invention further relates to a method of use and to the use of the multilayered brazing sheet material acting as a fluid passage channel in a charge-air-cooler, preferably an air-to-water charge-air-cooler.

The invention claimed is:

1. A multi-layered brazing sheet material consisting of an aluminium core alloy layer provided with a first brazing clad layer material on one face of said aluminium core alloy layer and a second brazing clad layer material on another face of said aluminium core alloy layer, and an inter-layer on one or either sides of the aluminium core alloy layer positioned between the aluminium core alloy layer and the first brazing clad layer material or the second brazing clad layer material,
wherein the aluminium core alloy layer is made from a 3xxx-series aluminium alloy having, in wt. %, up to 0.4% Si, up to 0.5% Fe, 0.4% to 0.75% Cu, 0.6% to 1.1% Mn, up to 0.07% Mg, up to 0.2% Cr, up to 0.25% Zr, up to 0.2% Ti, and up to 0.15% Zn, balance aluminium and impurities,
wherein the first brazing clad layer material and the second brazing clad layer material are made from a 4xxx-series aluminium alloy having 6% to 14% Si, up to 2% Mg, and up to 0.2% Zn, balance aluminium and impurities, and
wherein the inter-layer(s) is made from an aluminium alloy of the 3xxx-series alloys, having, in wt. %, up to 0.6% Si, 0.2% to 0.7% Fe, up to 0.2% Cu, 1.0% to 1.6% Mn, up to 0.1% Zn, up to 0.04% Mg, up to 0.2% Cr, up to 0.2% Zr, and up to 0.07% Ti, balance aluminium and impurities,
wherein the aluminium core alloy layer has been homogenised.

2. The brazing sheet material according to claim 1, wherein the aluminium core alloy layer is made from an aluminium alloy consisting of, in wt. %, up to 0.2% Si, 0.15% to 0.45% Fe, 0.50% to 1.0% Mn, up to 0.02% Mg, up to 0.09% Cr, up to 0.09% Zr, 0.05% to 0.2% Ti, and up to 0.15% Zn, balance aluminium and impurities.

3. The brazing sheet material according to claim 1, wherein the aluminium core alloy layer is made from an aluminium alloy consisting of, in wt. %, up to 0.2% Si, 0.25% to 0.45% Fe, 0.50% to 0.68% Cu, 0.7% to 0.95% Mn, up to 0.02% Mg, up to 0.04% Cr, up to 0.04% Zr, 0.06% to 0.12% Ti, and up to 0.15% Zn, balance aluminium and impurities.

4. The brazing sheet material according to claim 1, wherein the first brazing clad layer material is made from a 4xxx-series aluminium alloy having 6% to 14% Si and up to 0.35% Mg, balance impurities and aluminium.

5. The brazing sheet material according to claim 1, wherein the inter-layer(s) is made from a 3xxx-series alloy consisting of, in wt. %, 0.15% to 0.55% Si, 0.2% to 0.65% Fe, up to 0.15% Cu, 1.0% to 1.5% Mn, up to 0.1% Zn, up to 0.04% Mg, up to 0.2% Cr, up to 0.2% Zr, and up to 0.06% Ti, balance aluminium and impurities.

6. The brazing sheet material according to claim 1, wherein the inter-layer(s) is made from a 3xxx-series alloy consisting of, in wt. %, 0.2% to 0.5% Si, 0.25% to 0.65% Fe, up to 0.15% Cu, 1.1% to 1.4% Mn, up to 0.1% Zn, up to 0.04% Mg, up to 0.2% Cr, up to 0.2% Zr, and 0.02% to 0.06% Ti, balance aluminium and impurities.

7. The brazing sheet material according to claim 1, and wherein each inter-layer has a thickness of 90 μm.

8. The brazing sheet material according to claim 1, wherein the multi-layered brazing sheet material has a total thickness of 0.1 to 2.0 mm.

9. The brazing sheet material according to claim 1, wherein the brazing sheet material is provided in an O-temper.

10. A brazing tube made from the multi-layered brazing sheet material according to claim 1.

11. A heat exchanger comprising a brazed tube made from the multi-layered brazing sheet material according to claim 1.

12. A charge-air-cooler incorporating a brazed tube made from the multi-layered brazing sheet material according to claim 1.

13. The multi-layered brazing sheet material according to claim 1 as a brazed tube in a charge-air-cooler.

14. The brazing sheet material according to claim 1, wherein the first brazing clad layer material and second brazing clad layer material are each made from a 4xxx-series aluminium alloy having 6% to 14% Si and up to 0.10% Mg, balance impurities and aluminium.

15. The brazing sheet material according to claim 1, wherein each inter-layer has a thickness of 60 μm or less.

16. An air-to-water charge-air-cooler incorporating a brazed tube made from the multi-layered brazing sheet material according to claim 1.

17. The brazing sheet material according to claim 1, wherein the first brazing clad layer material and the second brazing clad layer material are each made from a 4xxx-series aluminium alloy having 6% to 14% Si and up to 0.35% Mg, balance impurities and aluminium.

18. The brazing sheet material according to claim 1, wherein the first brazing clad layer material and the second brazing clad layer material are made from the 4xxx-series aluminium alloy consisting of 6% to 14% Si, and up to 2% Mg, balance aluminium and impurities.

19. The brazing sheet material according to claim 1, wherein the inter-layer(s) consists of the aluminium alloy of the 3xxx-series alloys, having, in wt. %, up to 0.6% Si, 0.2% to 0.7% Fe, up to 0.2% Cu, 1.0% to 1.6% Mn, up to 0.04% Mg, up to 0.2% Cr, up to 0.2% Zr, and up to 0.07% Ti, balance aluminium and impurities.

\* \* \* \* \*